United States Patent [19]
Longo et al.

[11] 3,939,008
[45] Feb. 17, 1976

[54] USE OF PEROVSKITES AND PEROVSKITE-RELATED COMPOUNDS AS BATTERY CATHODES

[75] Inventors: John M. Longo, New Providence, N.J.; LeRoy R. Clavenna, Baytown, Tex.

[73] Assignee: Exxon Research and Engineering Company, Linden, N.J.

[22] Filed: Feb. 10, 1975

[21] Appl. No.: 548,291

[52] U.S. Cl. ...... 136/6 LN; 136/100 R; 136/120 FC
[51] Int. Cl.² ......................................... H01M 17/00
[58] Field of Search ..... 136/6 R, 6 LN, 20, 120 FC, 136/86 D, 100 R, 83 R, 120 R

[56] References Cited
UNITED STATES PATENTS 3,644,147  2/1972  Young ............................. 136/86 D
3,804,674  4/1974  Kudo et al ..................... 136/120 FC

*Primary Examiner*—Anthony Skapars
*Attorney, Agent, or Firm*—Joseph J. Dvorak

[57] ABSTRACT

A novel battery is disclosed in which the cathode active material is an oxide having a perovskite or perovskite related structure and the general formula $ABO_3$, wherein A is an element selected from Group IIA of the Periodic Table of the Elements and B is a non-noble transition metal selected from Group VIIB and VIII of the periodic Table of the Elements. The anode is a metal selected from cadmium, zinc, lead, lithium, sodium and potassium.

13 Claims, 3 Drawing Figures

3,939,008

USE OF PEROVSKITES AND PEROVSKITE-RELATED COMPOUNDS AS BATTERY CATHODES

BACKGROUND OF THE INVENTION

1. Field of the Invention

The present invention relates generally to batteries and specifically to batteries of the type having a cathode-active material stored within the cathode structure.

2. Description of the Prior Art

As is known in the art, fuel cells are often referred to as primary cells in which a combustible fuel is converted to electrical energy at non-sacrificial or inert electrodes. Generally, a fuel cell would contain at least two non-sacrificial or inert electrodes functioning as an anode and a cathode, respectively. Typically, a fuel and an oxidant are fed to the anode and cathode from a source external the cell. In contrast thereto, traditional primary and secondary cells derive their electrical energy from active materials stored in solid electrodes. The present invention is directed toward the latter type of batteries or electrochemical cells.

SUMMARY OF THE INVENTION

According to the present invention there is provided an electrical energy storage device which has a cathode-active material, an oxide having the perovskite or perovskite related structure and the general formula $ABO_3$. In the formula $ABO_3$, A is an element from the group consisting of non-transition metals selected from Group IIA of the Periodic Table of the Elements, and include Ca, Ba, and Sr and B is a first row transition metal selected from Groups VIIB and VIII of the Periodic Table of the Elements, and include Mn, Fe, Co, and Ni. The Periodic Table referred to herein is that described in "Encyclopedia of Chemistry," Reinhold Publishing Corporation, 2nd Edition (1966) at p. 790. Specific examples of the cathode-active materials include, among others, $CaMnO_3$, $BaNiO_3$, $SrCoO_3$, $SrFeO_3$.

The anode in the electrical energy storage device of the present invention is a metal selected from a group consisting of cadmium, zinc, lead, lithium, sodium, and potassium.

The electrolyte useful in the present invention includes aqueous electrolytes such as aqueous solutions of potassium hydroxide, sodium hydroxide, and ammonium chloride and nonaqueous or organic electrolytes such as propylene carbonate solutions of alkali metal salts.

In a preferred embodiment of the present invention, there is provided an electrical energy storage device comprising a container having a basic electrolyte therein, a metal anode and a cathode-active material comprising the metal oxide, $CaMnO_3$.

DETAILED DESCRIPTION OF THE INVENTION

Figure 1:
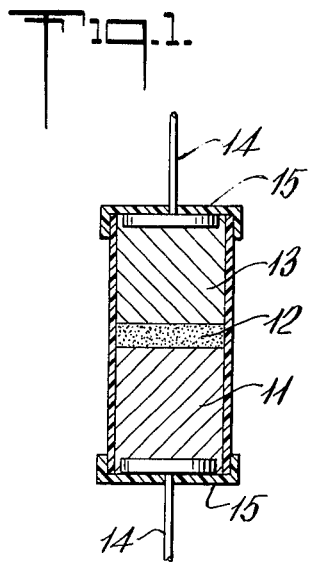
FIG. 1 is a diagrammatic illustration of an electrical energy storage device of the present invention.

In FIG. 1 of the drawing there is illustrated an electrical energy storage structure which has a cathode-active material 11, a separator 12 impregnated with an electrolyte and an anode material 13, each within a container having end covers 15. Also shown are the current collectors 14 on both sides of the structure.

Typically, the container and the end covers 15 are made of an inert, non-conducting material. The current collectors 14 on the other hand are not only chemically inert but preferrably are fabricated from highly conductive materials.

The anode of the electric chemical storage device of the present invention is an electropositive metal selected from the group consisting of cadmium, zinc, lithium, sodium and lead. Typically, the anode metal may be pressed into the form of a pellet or in the case of a thin film battery may be rolled in a thin sheet. In the preferred embodiment of the present invention the metal anode is zinc.

The cathode-active material of the electrical energy storage device of the present invention is an oxide which has the perovskite or perovskite related structure and the general formula $ABO_3$ wherein A is an element selected from the group consisting of non-transition metals from Group IIA of the Periodic Table of the Elements and B is a first row transition metal selected from Groups VIIB and VIII of the Periodic Table of the Elements. For example, A may be an element such as Ca, Sr and Ba, and B may be an element such as Mn, Fe, Co, and Ni. Specific examples of the cathode-active materials include, among others, $CaMnO_3$, $BaNiO_3$, $SrCoO_3$, $SrFeO_3$. These materials exhibit a wide range of oxygen nonstoichiometry and contain cations in high oxidation states that are readily reducible. These materials have relatively low electrical resistivities and, as the cathode-active materials of the present invention, serve as a solid source of cathodic oxygen. The wide range of oxygen nonstoichiometry allows these compounds to function as rechargeable cathode-active materials over the range of nonstoichiometry.

The cathode structure itself need not necessarily be formed entirely of the cathode-active material. Indeed, the cathode-active material may be deposited on an electrode structure such as carbon, copper, nickel, and the like. Preferably, however, the cathode structure consists of the cathode-active material in admixture with carbon. The amount of carbon with which the perovskite cathode-active material is mixed is not critical; however, in the preferred embodiment of the present invention the weight ratio of perovskite active cathode material to carbon is generally in the range of about 10:1 to 1:10 and most preferably in the range of about 2:1 to 1:2.

The technique for preparing the perovskite cathode-active materials of the present invention are well-known. For example, the preferred cathode-active material, $CaMnO_3$, is readily prepared by the solid state reaction at high temperatures of stoichiometric mixtures of almost any calcium and manganese compound. Thus a stoichiometric mixture of $CaCO_3$ and $MnO_2$ in a ceramic boat heated for just a few days at 1000°–1300°C. produces the black product, $CaMnO_3$.

Indeed, this black product, $CaMnO_3$, with the perovskite structure is the preferred cathode active material. This material contains manganese in a high oxidation state, e.g. 4+ state, is made from abundant and inexpensive raw materials, has low electrical resistivity (<1100 $\Omega$-cm) and has the lowest molecular weight of the other cathode-active materials disclosed herein.

The electrolyte system employed in the present invention may be aqueous or nonaqueous. A preferred nonaqueous electrolyte is a propylene carbonate solution of an alkali metal salt, such as $LiPF_6$ for example. With zinc and cadmium anodes, aqueous solutions of sodium and potassium hydroxide are particularly preferred as the electrolytes of choice. As is shown in FIG. 1 the electrolyte can be supported within the cell on a suitable matrix. Alternatively the anode and cathode materials can be used to support electrolyte. Other typical battery configurations can be employed in the system of the present invention.

The following examples further illustrate the capabilities of the electrochemical cells of the present invention.

EXAMPLE 1

In this example, a number of tests were carried out on half-cell cathodes using an electrolyte of 9M KOH. In these tests the cathode-active materials were admixed with acetylene black typically in a ratio of 2:1. To this mixture was added enough electrolyte, 57 ± 3 wt. %, to form a thick paste. The paste was compressed into a polytetrafluoroethylene cell between a gold current collector and a separator supported by a gold screen. The cell was designed such that it could contain from 0.25 to 0.5 g of cathode-active material and that the effective working area of the cathode was 5 cm². A Permion membrane (229140/30) sold by RAI Research Corporation, Hauppauge, N.Y., or a glass fiber filter paper was used as the separator; and, the results appeared to be independent of these separators. The polytetrafluoroethylene cell containing the cathode material was immersed into 400ml of electrolyte. The cathode was examined at room temperature using a standard half-cell arrangement with a graphite counter electrode and a saturated calomel reference electrode, SCE. The electrolyte was purged with argon to remove dissolved oxygen. The half-cell was discharged or recharged by driving it galvanostaticly (at constant current).

EXAMPLE 2

Figure 2:
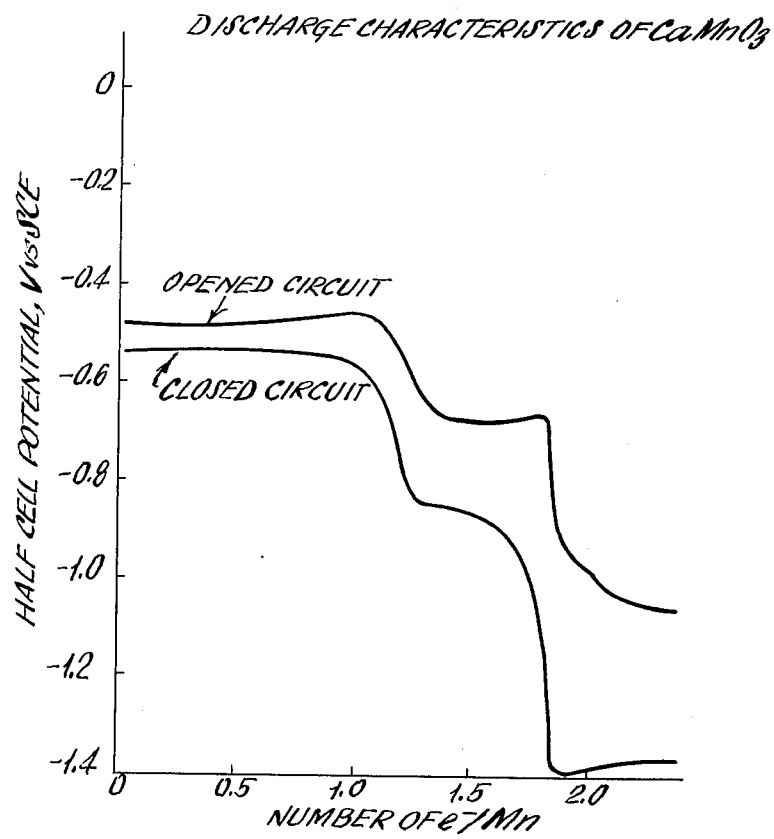
FIG. 2 is a graph showing the half cell potential, both at closed circuit and at open circuit, when $CaMnO_3$ was employed as a cathode-active material according to the present invention.

Following the general procedures of Example 1, a half-cell containing 0.27 g of $CaMnO_3$ was discharged to completion by repeated closed circuiting at a current density of 1.0 mA/cm² for 0.5 hr. and opened circuiting (zero current density) for 1.0 hr. FIG. 2 shows the half-cell potentials at closed circuit and opened circuit versus the depth of discharge. The depth of discharge is indicated as the number of electrons supplied to the cathode per manganese atom in the cathode active material. The initial state of manganese in $CaMnO_3$ is $Mn^{4+}$. If the cathode material was fully utilized, complete discharge would correspond to conversion of all $Mn^{4+}$ to $Mn^{2+}$, or supplying $2e^-/Mn$. The results in FIG. 2 show that initially the half-cell potential is approximately constant but that there is a rapid decrease in potential at a discharge depth of ~1 $e^-/Mn$ and another at ~1.8 $e^-/Mn$. The first decrease is associated with the conversion of $Mn^{4+}$ to $Mn^{3+}$ and the second with the conversion of $Mn^{3+}$ to $Mn^{2+}$.

EXAMPLE 3

Figure 3:
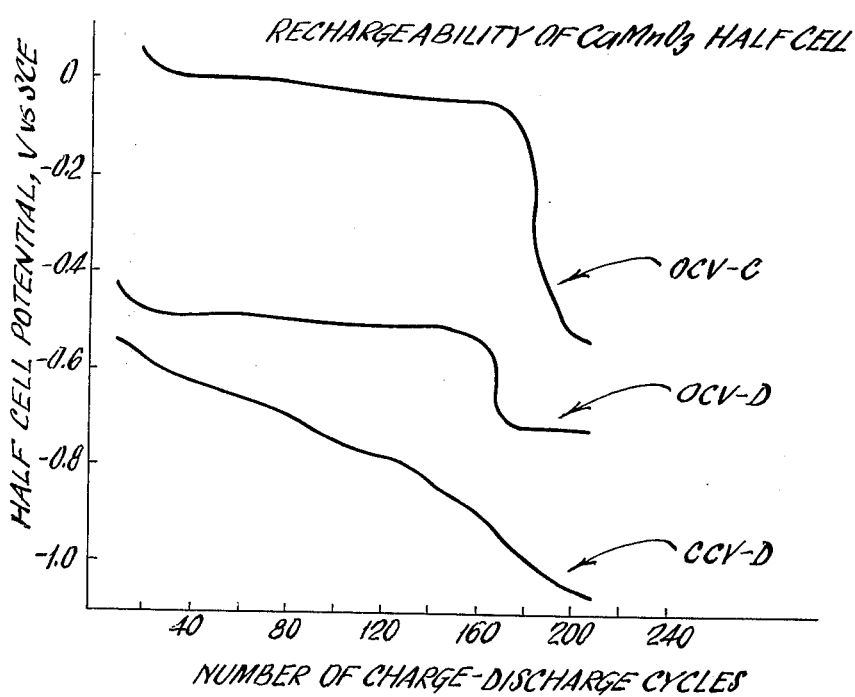
FIG. 3 is a graph showing the charge-discharge characteristics for a half cell having $CaMnO_3$ as the cathode-active material in accordance with the present invention.

In another test, the rechargibility of the half-cell cathode was examined by running the cathode through many charge/discharge cycles. A charge/discharge cycle consisted of discharging a fully charged half-cell cathode to a depth of 1/8 $e^-/Mn$ over a period of one hour at constant current, running at open circuit for fifteen minutes, recharging with 1/8 $e^-/Mn$ over a period of 1 hour at constant current and then running at open circuit again for 15 minutes. The results for a half-cell cathode that was charged/discharged 205 cycles with a current density of 2.56 mA/cm² are presented in FIG. 3 which shows the half-cell potential at various stages in a cycle versus the number of charge/discharge cycles. The half-cell potential is given at the closed circuit voltage during discharging, CCV-D; the open circuit voltage after discharging, OCV-D; and the open circuit voltage after recharging, OCV-C. The results show that this cathode material does have recharge capabilities for at least 170 cycles for a discharge depth of 1/8 $e^-/Mn$ per cycle.

EXAMPLE 4

Following the procedure of Example 2, half-cell discharge experiments were carried out with $BaNiO_3$ and $SrCoO_3$. For a half-cell containing 0.410 g $BaNiO_3$ and 0.205 g acetylene black with a 1mA discharge rate, the voltage (vs SCE) dropped from an open circuit value of +0.01V to −0.18V and held for 4½ hours, then dropped rapidly to −0.55V and finally fell more slowly over 2½ hours to −1.37V. For a half-cell containing 0.172g $SrCoO_3$ and 0.17g acetylene black with a 1mA discharge rate, the voltage (vs SCE) dropped from an open circuit value of −0.07 to −0.25 in 4 hours, dropped to −0.48V during the next 5 hours and finally slowly dropped to −1.1V over the next 6 hours.

EXAMPLE 5

Small complete cells were constructed with Zn anodes. These cells were similar to that shown in FIG. 1. The cathode active materials employed were $BaNiO_3$ and $SrCoO_3$ admixed with acetylene black as in Example 4. The open circuit voltages of the cells was measured and found to be 1.63V for the $BaNiO_3$ containing cell and 1.55V for the $SrCoO_3$ containing cell.

EXAMPLE 6

$CaMnO_3$ was also examined in a complete cell having a Li anode and a propylene carbonate/$LiPF_6$ electrolyte. The cell gave an open circuit voltage of 3.1V on a 0.1g sample. This value dropped to 2.83V at 0.1mA/cm² discharge, 2.71V at 0.2mA/cm² discharge and then dropped rapidly at 2V at a discharge of 0.4mA/cm².

What is claimed is:
1. An electrical energy storage device comprising:
   a. a container;
   b. an electrolyte in said container;
   c. a metal anode; and
   d. a cathode-active material, said cathode active material being an oxide of the general formula $ABO_3$ and having perovskite structure, wherein A is selected from the group consisting of non-transition metals of Group IIA of the Periodic Table of the Elements and B is a non-noble transition metal selected from Groups VIIB and VIII of the Periodic Table of the Elements.

2. The device of claim 1 wherein the electrolyte is an aqueous base.

3. The device of claim 2 wherein the aqueous base is an alkaline metal or alkaline earth metal hydroxide.

4. The device of claim 1 wherein the metal anode is selected from zinc, lead, cadmium, lithium, sodium and potassium.

5. The device of claim 1 wherein the metal anode is zinc.

6. The device of claim 1 wherein the cathode-active material is selected from the group consisting of $CaMnO_3$, $BaNiO_3$, $SrCoO_3$ and $SrFeO_3$.

7. The device of claim 6 wherein the said cathode-active material is mixed with carbon black.

8. The device of claim 7 wherein the cathode-active material is $CaMnO_3$.

9. The device of claim 1 wherein the electrolyte is a non-aqueous electrolyte.

10. The device of claim 9 wherein the non-aqueous electrolyte is propylene carbonate.

11. A battery comprising a container, an aqueous basic electrolyte, a metal anode selected from zinc, cadmium or lead and a cathode-active material selected from the perovskites $CaMnO_3$, $BaNiO_3$, $SrCoO_3$ and $SrFeO_3$.

12. A battery comprising a container, a non-aqueous electrolyte, a metal anode selected from lithium, potassium and sodium, and a cathode-active material selected from the perovskites $CaMnO_3$, $BaNiO_3$, $SrCoO_3$ and $SrFeO_3$.

13. The battery of claim 12 wherein the electrolyte is propylene carbonate, the anode metal is lithium and wherein $LiPf_6$ is dissolved in the electrolyte.

* * * * *